United States Patent
Jiang et al.

(10) Patent No.: US 8,078,054 B2
(45) Date of Patent: Dec. 13, 2011

(54) APPARATUS AND METHOD FOR IMPROVING THE TOLERANCE OF TONE-BASED OPTICAL CHANNEL MONITORING TO STIMULATED RAMAN SCATTERING

(75) Inventors: Song Jiang, Watchung, NJ (US); Colin Kelly, Ottawa (CA); Xiang Liu, Marlboro, NJ (US); Derrick Remedios, Ottawa (CA)

(73) Assignee: Alcatel Lucent, Paris (FR)

(*) Notice: Subject to any disclaimer, the term of this patent is extended or adjusted under 35 U.S.C. 154(b) by 761 days.

(21) Appl. No.: 12/164,253

(22) Filed: Jun. 30, 2008

(65) Prior Publication Data

US 2009/0324219 A1    Dec. 31, 2009

(51) Int. Cl.
*H04J 14/02* (2006.01)
*H04B 10/08* (2006.01)

(52) U.S. Cl. ................. 398/32; 398/34; 398/83
(58) Field of Classification Search ............. 398/32, 398/34, 38, 83
See application file for complete search history.

(56) References Cited

U.S. PATENT DOCUMENTS

| | | | |
|---|---|---|---|
| 6,388,783 B1 * | 5/2002 | Weller-Brophy | ............... 398/82 |
| 7,031,606 B2 | 4/2006 | Liu et al. | |
| 7,054,556 B2 | 5/2006 | Wan et al. | |
| 7,142,783 B2 | 11/2006 | Obeda et al. | |
| 7,155,122 B2 | 12/2006 | Wan et al. | |
| 7,158,723 B2 | 1/2007 | Wan et al. | |
| 2003/0067646 A1 | 4/2003 | Wan et al. | |
| 2004/0057729 A1 * | 3/2004 | Forbes et al. | ............... 398/149 |
| 2005/0099953 A1 | 5/2005 | MacDonald | |
| 2006/0034608 A1 | 2/2006 | Holmes et al. | |

FOREIGN PATENT DOCUMENTS

EP    1404044 A2    3/2004

OTHER PUBLICATIONS

A.R. Chraplyvy, "Optical Power Limits in Multi-Channel Wavelength-Division-Multiplexed Systems Due to Stimulated Raman Scattering," Electronic Ltrs, Jan. 19, 1984, pp. 58-59.

* cited by examiner

*Primary Examiner* — Leslie Pascal
(74) *Attorney, Agent, or Firm* — Brosemer, Kolefas & Associates LLC

(57) ABSTRACT

For wavelength division multiplexing (WDM) communications, apparatus and methods are provided for performing tone-based optical channel monitoring that is less sensitive to stimulated Raman scattering (SRS). In tone-based optical channel monitoring, in which WDM channels are modulated with one or more tones, detecting and measuring the tone power is commonly used as a measure of signal power in each channel. In WDM systems with long fiber spans and high signal powers, however, SRS tends to transfer energy from shorter wavelengths to longer wavelengths, whereby the tones are no longer accurately indicative of the signal power of the individual wavelength channels. Apparatus and methods are provided which reduce the effect of SRS by filtering the monitored WDM signals into sub-bands and detecting each sub-band independently.

17 Claims, 5 Drawing Sheets

APPARATUS AND METHOD FOR IMPROVING THE TOLERANCE OF TONE-BASED OPTICAL CHANNEL MONITORING TO STIMULATED RAMAN SCATTERING

FIELD OF THE INVENTION

The present invention relates to the field of optical communications, and more specifically to apparatus and methods relating to tone-based optical channel monitoring.

BACKGROUND INFORMATION

For tone-based channel monitoring in a wavelength division multiplexing (WDM) communications system, each wavelength is modulated with one or more tones that are specific to the wavelength. U.S. Pat. No. 7,054,556 to Wan et al. describes a scheme in which channels in an optical WDM system are each modulated by two or more alternating dither tones so that at any instant, each channel is modulated by at least one dither tone. As described therein, channel monitoring by detecting the dither tones makes use of a Fast Fourier Transform (FFT) process which can decode and measure dither tones encoded on the WDM channels.

In carrying out such non-intrusive real-time channel monitoring, a tone decode subsystem (also referred to as a wavelength tracker) is used. In a wavelength tracker, the optical WDM signal is typically converted to an electrical signal using a photodiode. The tones in the converted electrical signal and their respective levels provide information regarding which wavelength channels are present in the WDM signal as well as the optical power levels of the channels present. This information is critical to the WDM system for channel monitoring and power management. For example, wavelength channels whose power levels are monitored to be below (above) the desired level can be boosted (attenuated), e.g., via gain equalization in an optical amplification stage, in order to achieve good transmission performance of all the channels.

To monitor the powers of the wavelength channels in a WDM system, the operation of a conventional wavelength tracker detector is based on the simultaneous measurement of the powers of the different frequency tones that are assigned to different WDM channels. Stimulated Raman scattering (SRS) during optical fiber transmission, however, has the effect of transferring energy from shorter wavelength channels to longer wavelength channels, especially when the powers of these channels are high and/or the transmission distance is long. Such energy transfer is also called SRS-induced channel crosstalk which causes an appreciable portion of the frequency tone that is originally assigned to a given wavelength channel to be transferred to other WDM channels. This makes a conventional wavelength tracker inaccurate in reporting the power level of each channel and subsequently causes power tilt and degradation in optical signal-to-noise ratio (OSNR), thereby negatively affecting system performance. In some cases, the inaccuracy may become so large that the wavelength tracker will incorrectly report the presence or absence of a wavelength channel.

It is thus desired to improve the tolerance of tone-based wavelength tracking to SRS so that accurate optical channel monitoring can be achieved even with high signal power and system reach.

There is no known solution to the above-described problem. A possible approach towards remedying this problem is to estimate the tone transfers among the WDM channels in each fiber span, and calibrate the measured power for each frequency tone to reflect the actual power of the wavelength channel to which the tone frequency is assigned. This approach, however, requires the knowledge of the channels transmitted in each fiber span such as the locations and input powers of the channels, the tone components currently carried in each channel, and the fiber nonlinear and loss coefficients. The tone transfers in the fiber span then need to be computed, which is computationally intensive.

Moreover, the powers of the frequency tones impressed on a given channel due to the SRS need to be recorded and this information passed with the channel for further computation at the next wavelength tracker. This becomes impractical to realize in transparent WDM systems using reconfigurable optical add/drop multiplexers (ROADMs), where a wavelength channel can be added, dropped, or re-routed on demand.

SUMMARY OF THE INVENTION

The present invention is directed to apparatus and methods that substantially increase the accuracy of tone-based optical channel monitoring in the presence of SRS-induced crosstalk. Based on the understanding that the majority of the SRS-induced crosstalk occurs between channels that are far apart, an exemplary embodiment of the present invention uses a WDM filter to separate the WDM channels into at least two groups, e.g., a short-wavelength group and a long-wavelength group, and measures the tone powers for each of the channel groups individually. Since the wavelength range in each channel group is substantially reduced and the worst-case SRS-induced crosstalk roughly scales quadratically with the wavelength range, the tolerance of the wavelength tracker to SRS-induced crosstalk is much improved.

The present invention thereby provides a cost-effective wavelength tracker technology that can be used for WDM systems with extended reach and increased signal power.

The aforementioned and other features and aspects of the present invention are described in greater detail below.

DETAILED DESCRIPTION

Figure 1:
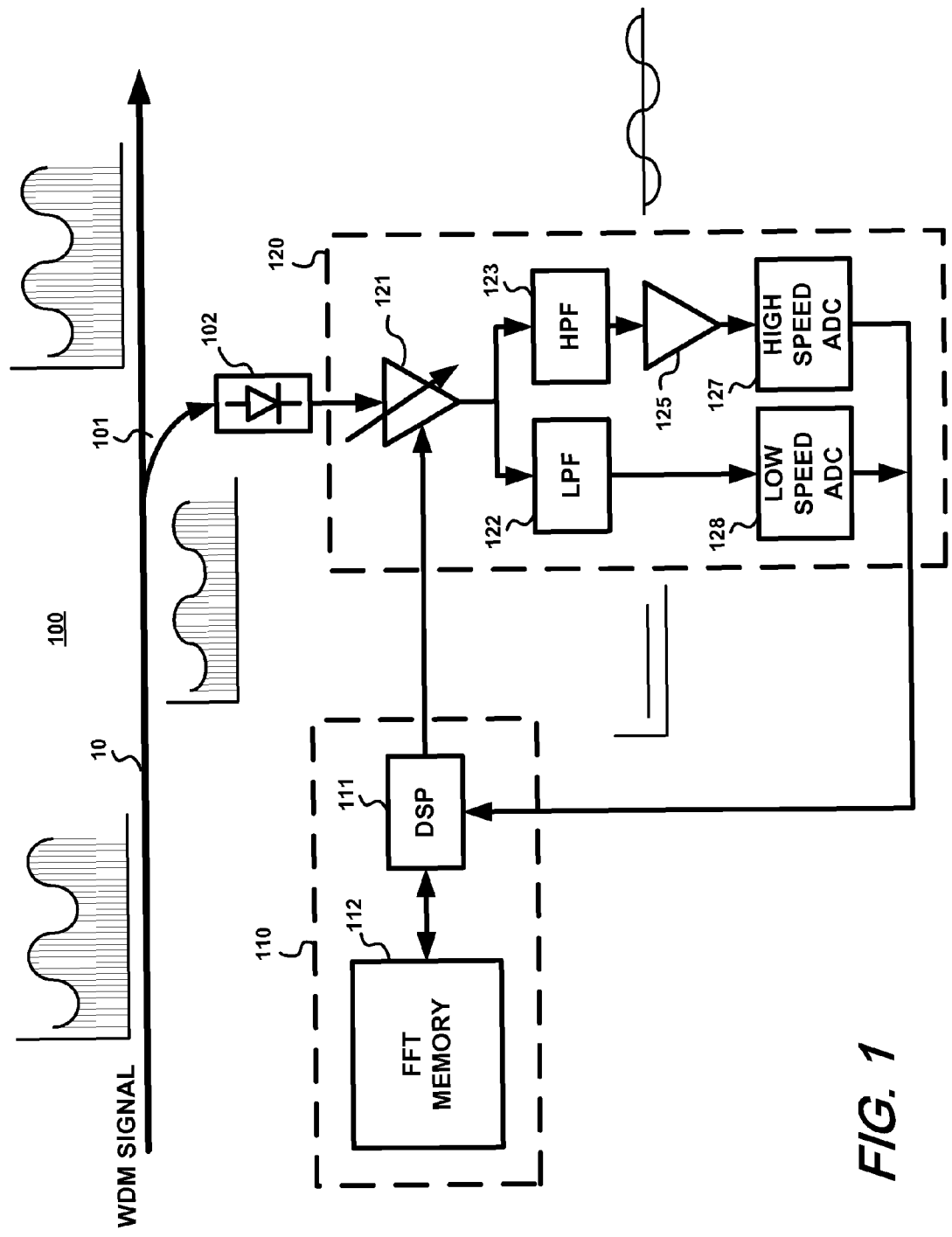
FIG. 1 is a block diagram of an exemplary wavelength tracker system wherein all channels of a tapped optical WDM signal are electrically converted using a single photodiode.

FIG. 1 is a block diagram of an exemplary wavelength tracker system 100. The system comprises an optical tap 101 which taps a small portion (e.g., ≦10% by power) of an optical WDM signal on an optical path 10 to be monitored. The optical tapped signal is converted to an electrical signal by an optical detector 102, such as a photodiode, a PIN detector, or the like. In an exemplary embodiment, a relatively low-speed (~1 MHz) photodiode can be used for this purpose.

The electrical signal is provided to a tone detector 120. In the tone detector 120, the electrical signal is provided to a variable gain amplifier (VGA) 121 whose gain is controlled by a digital signal processing (DSP) unit 110, described in greater detail below. The output of the VGA 121 is coupled to a low-pass filter (LPF) 122 and a high-pass filter (HPF) 123. The output of the HPF 123 is coupled to an amplifier 125 whose output is coupled to a high-speed analog-to-digital converter (ADC) 127. The output of the LPF 122 is coupled to a low-speed ADC 128. The outputs of the ADCs 127 and 128 are monitored by the DSP unit 110.

The LPF 122 and low-speed ADC 128 provide a representation of the DC level of the WDM signal to the DSP unit 110, and the HPF 123, amplifier 125, and high-speed ADC 127 provide a representation of any signals within the frequency band of any dither tones that may have been imposed on channels of the WDM signal. The DC level can be used to estimate the average total power of the WDM signal. In an exemplary embodiment, the tones may be within a band of frequencies from 782 kHz to 814 kHz. Accordingly, the HPF 123 and the high-speed ADC 127 are designed to pass and convert signals in that band. As examples, the cut-off frequencies of the LPF 122 and the HPF 123 can be about 1 kHz and 2 kHz, respectively.

The DSP unit 110 comprises a processor 111 coupled to a memory 112 containing Fast Fourier Transform (FFT) data. The processor 111 may be implemented, for example, with a microprocessor, a digital signal processor, or the like.

In operation, the processor 111 controls the gain of the amplifier 121 in accordance with the low-frequency signal provided by the ADC 128 such that the signal power levels at the inputs of high-speed ADC 127 and low-speed ADC 128 are optimized with respect to the dynamic ranges of the ADCs. The processor 111 operates in known manner using the memory 112 to perform FFT processing of the digital signals provided by the ADCs 127 and 128 to detect any dither tone modulation of the optical WDM signal on the optical path 10. This determines the respective dither tones, and hence optical WDM channel identification, thereby providing an indication of which channels are present in the optical path 10. Additionally, the DSP unit 110 can measure the levels of the detected tones, thereby providing an indication of the respective optical signal power level of each channel in the WDM signal on optical path 10.

Figure 2A:
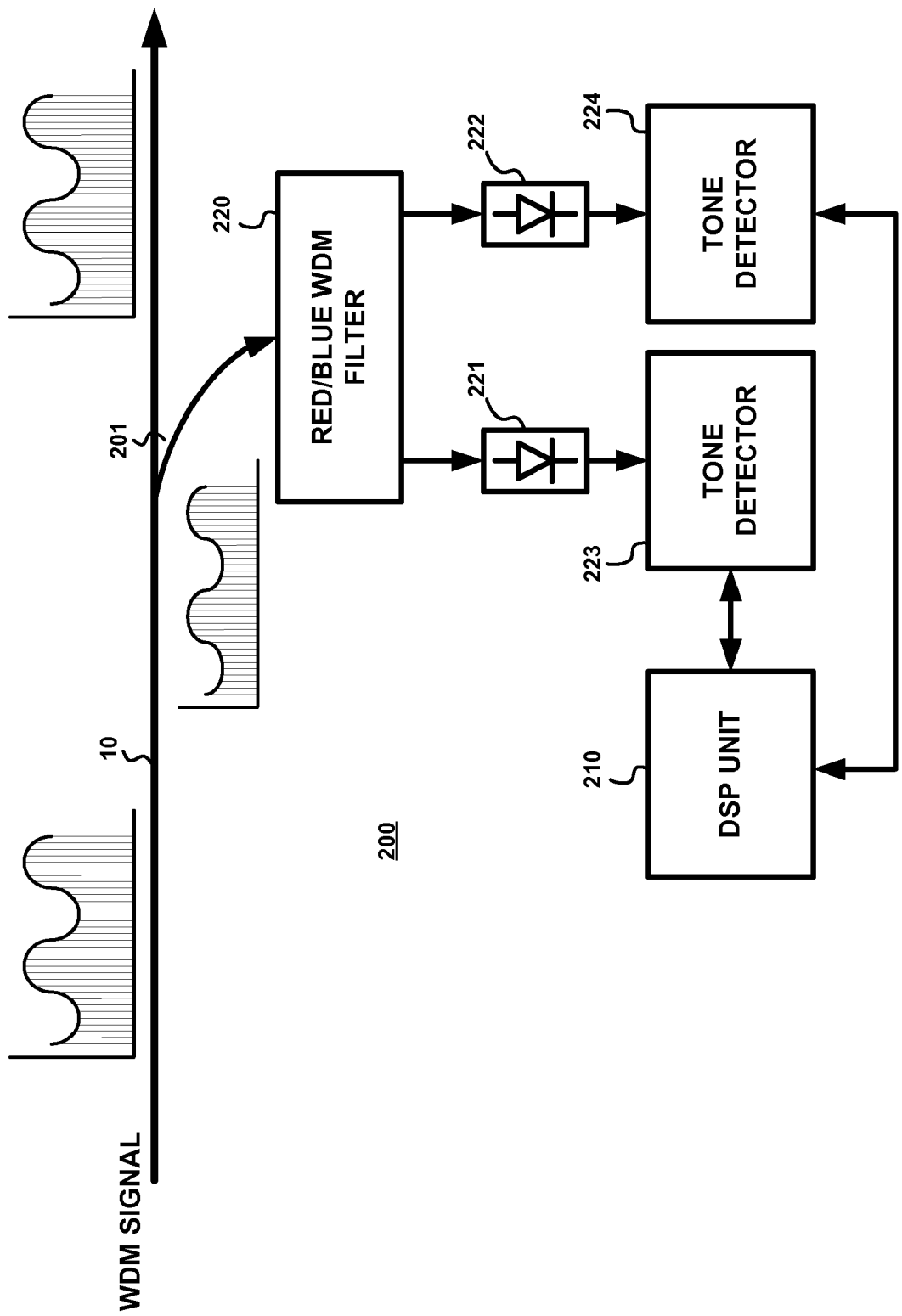
FIG. 2A is a block diagram of an exemplary embodiment of a wavelength tracker system wherein a tapped optical WDM signal is filtered into red and blue bands, with each band electrically converted by a respective photodiode.

FIG. 2A is a block diagram of an exemplary embodiment of a wavelength tracker system 200 in accordance with the present invention for monitoring a WDM signal. The system comprises an optical tap 201 which taps a small portion of the WDM signal to be monitored. In this embodiment, the WDM signal is in the C-band, ranging in wavelength from 1,529 nm to 1,562 nm, although the present invention is not limited to any particular band and may also be used in applications with more than one band.

A red-blue WDM filter 220 separates the tapped signal into two groups, a blue-band group ranging from 1,529 nm to 1,543 nm, and a red-band group ranging from 1,547 nm to 1,562 nm. The two groups are then simultaneously detected by respective detectors 221 and 222, followed by respective tone detectors 223 and 224, similar to that described above.

Based on the outputs of the tone detectors 223 and 224, a digital signal processing (DSP) unit 210 calculates the power of each WDM channel that is present in the blue-band group and each WDM channel that is present in the red-band group.

By separating the WDM channels into the red-band and blue-band groups, and detecting the groups separately, it is expected that the wavelength tracker 200 will have an approximately 6 dB improvement in tolerance to stimulated Raman scattering (SRS) over the wavelength tracker 100 described above. The 6 dB improvement in tolerance to SRS means that a four times greater signal power or a four times longer transmission distance can be allowed for the same monitoring accuracy.

Figure 2B:
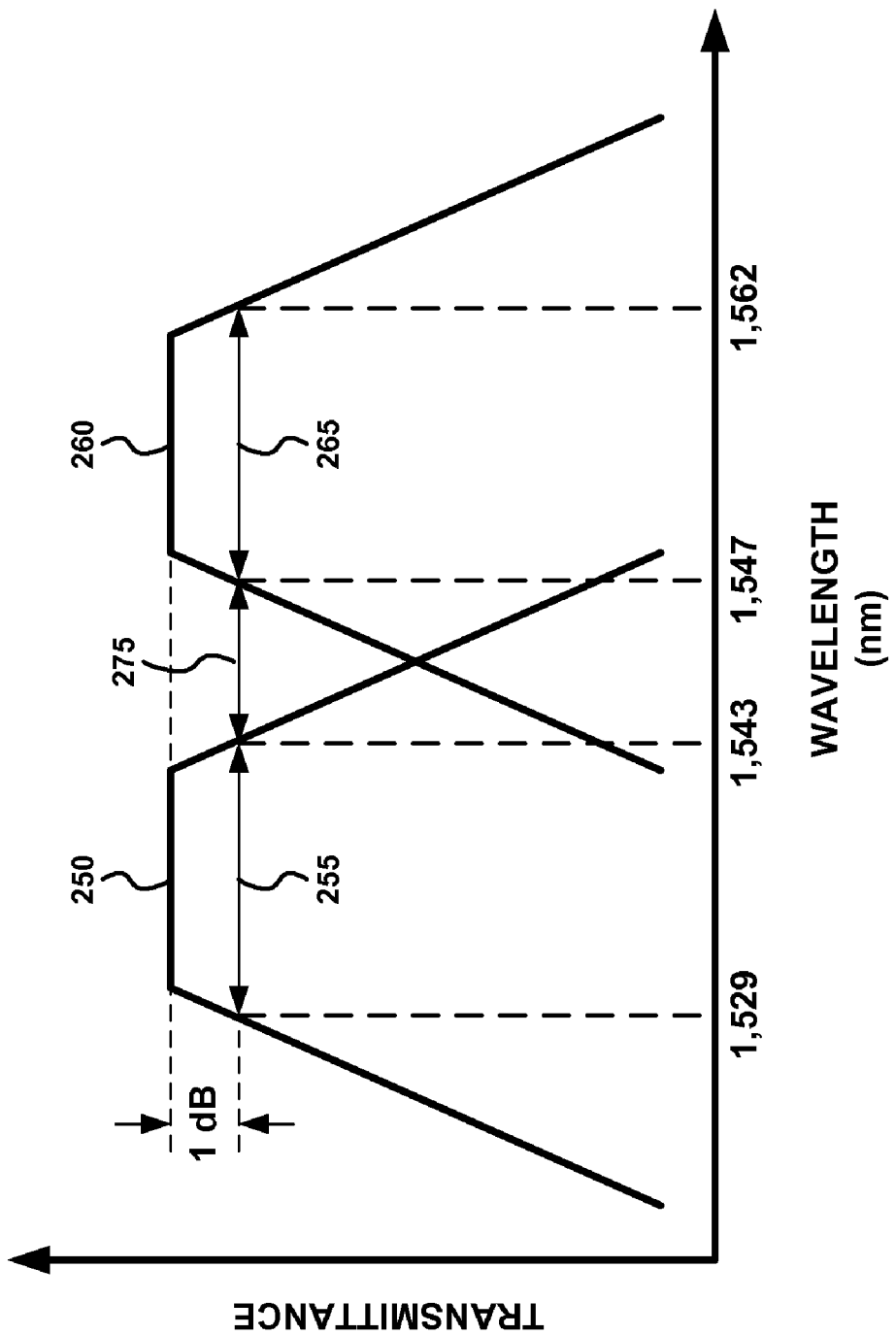
FIG. 2B shows the transmittance characteristics of a red/blue filter device for use in the exemplary system of FIG. 2A.

The red/blue WDM filter 220 can be implemented using a variety of conventional, off-the-shelf optical filtering devices, such as for example, a device with one input port that takes in the WDM signal and two output ports, a "blue" output that outputs the so-called "blue" band with a 1-dB passband between 1,529 nm and 1,543 nm, and a "red" output that outputs the so-called "red" band with a 1-dB passband between 1,547 nm and 1,562 nm. The transmittance characteristics of such a device are illustrated in FIG. 2B, with 250 representing the transmittance of the blue output and 260 representing the transmittance of the red output. The 1-dB passband 255 of the blue output is defined as the region where the transmittance 250 is within 1-dB from the peak transmittance, and similarly the 1-dB passband 265 of the red output is defined as the region where the transmittance 260 is within 1-dB from the peak transmittance. This leaves an "intermediate" band 275 between the red and blue bands, i.e., 1,543-1,547 nm that is partially attenuated and passed to different degrees by the red and blue output ports. The intermediate band 275 may also carry WDM channels, and it is desirable that the powers of these channels be monitored as well. In common red/blue WDM filters, the transmittance of the red passband and that of the blue passband are complementary (due to energy conservation). Thus, the channel power of a WDM channel in the intermediate band in the 1,543 nm-1,547 nm range can be obtained by summing up the powers measured from the red-band output and the blue-band output for the tone frequency corresponding to the WDM channel. This summation can be carried out by the DSP unit 210.

Figure 3:
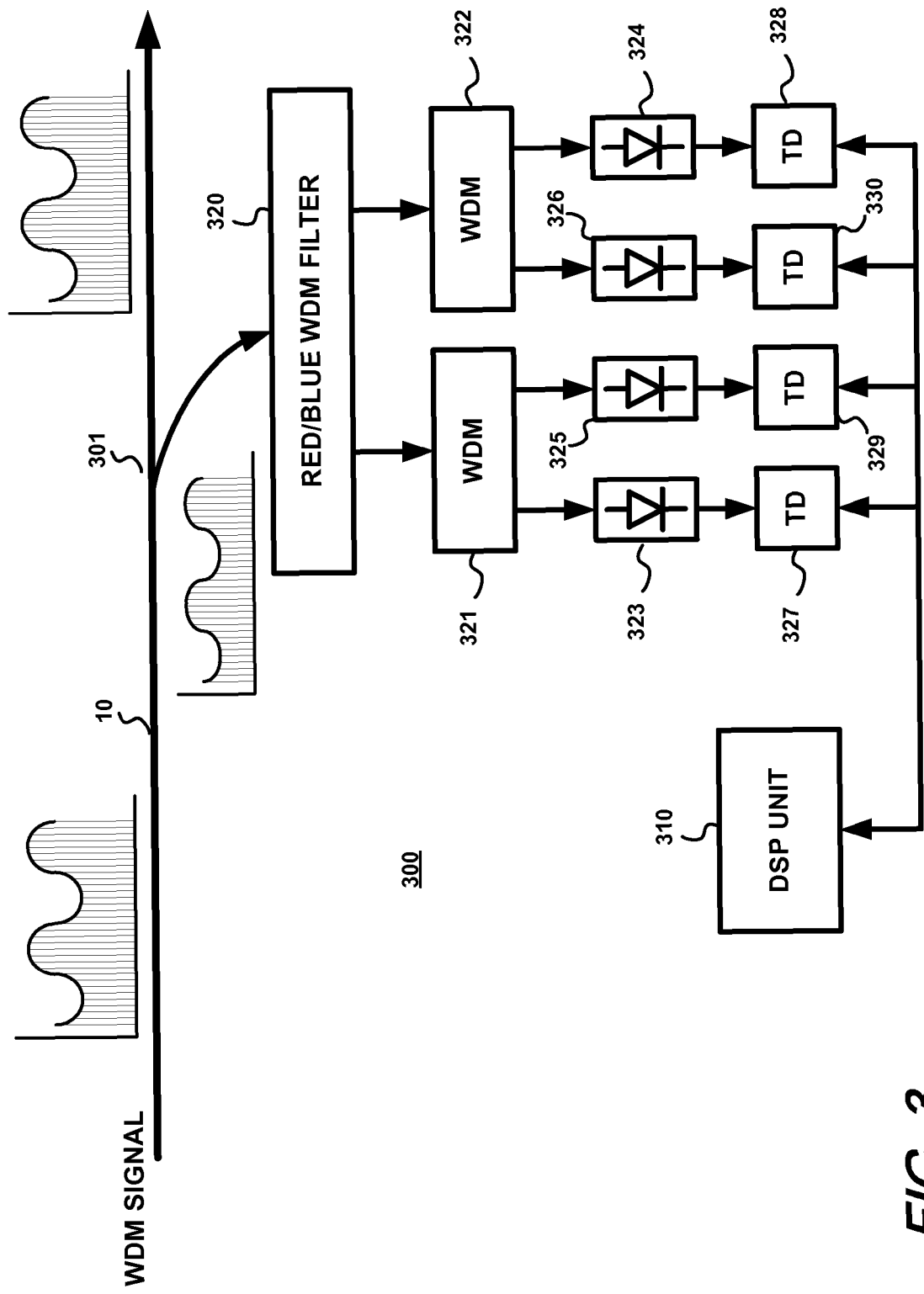
FIG. 3 is a block diagram of a further exemplary embodiment of a wavelength tracker system wherein a tapped optical WDM signal is filtered into four bands, with each band electrically converted by a respective photodiode.

FIG. 3 is a block diagram of a further exemplary embodiment of a wavelength tracker system 300 in which the red and blue bands are further split into four wavelength sub-bands by respective WDM filters 321 and 322. The filters 321 and 322 are preferably wavelength non-skipping filters.

In the exemplary embodiment, the four wavelength sub-bands are 1,529 nm to 1,536 nm, 1,536 nm to 1,543 nm, 1,547 nm to 1,554.5 nm, and 1,554.5 nm to 1,562 nm. The four wavelength groups are then simultaneously detected by respective PIN detectors 323-326, followed by respective tone-detection circuitry 327-330, similar to that described above.

Note that in this embodiment, the WDM filters 321 and 322 can be implemented with conventional, off-the-shelf optical filtering devices so as to provide no gap between the sub-bands within each of the red and blue bands. This is due to the narrower bandwidths of the sub-bands. The intermediate band between the red and blue bands, i.e., 1,543 nm-1,547 nm, can be handled as described above.

A digital signal processing (DSP) unit 310 calculates the power of each wavelength channel in each of the wavelength sub-bands and controls the gains of the tone detectors 327-330, in similar manner to the DSP unit 210 described above. The expected improvement in SRS tolerance of the wavelength tracker 300 over the wavelength tracker 100 described above is approximately 12 dB.

In further exemplary embodiments (not shown) the four wavelength sub-bands of the embodiment of FIG. 3 can be further sub-divided to eight sub-bands, which in turn can be further sub-divided to 16 sub-bands, and so on, to provide even better SRS tolerance.

Figure 4:
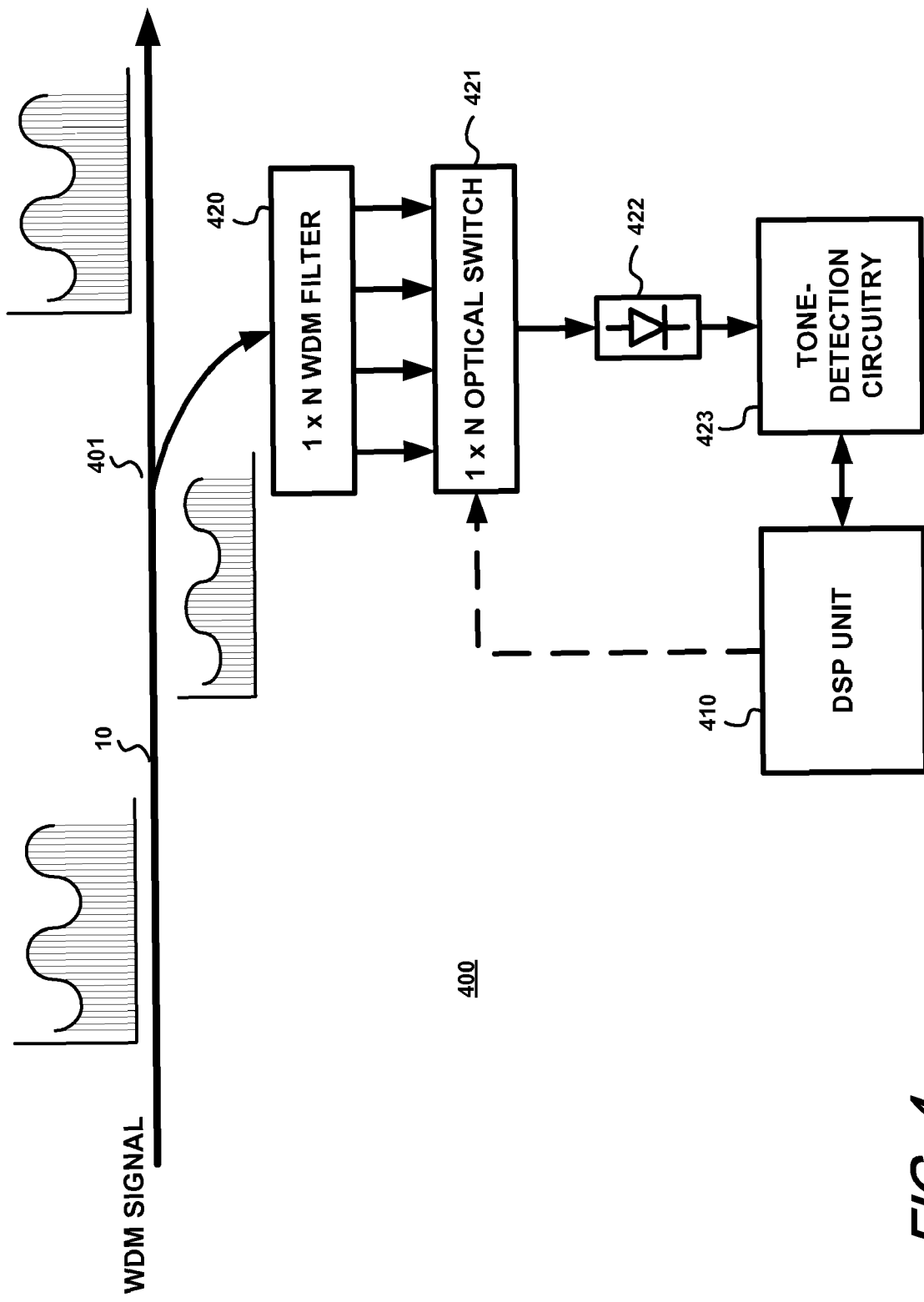
FIG. 4 is a block diagram of yet a further exemplary embodiment of a wavelength tracker system wherein a tapped optical WDM signal is filtered into multiple bands, with each band electrically converted by a time-shared photodiode.

FIG. 4 is a block diagram of yet a further exemplary embodiment of a wavelength tracker system 400 in which instead of using multiple PIN detectors and multiple tone detectors, one PIN detector 422 and one tone detector 423 are used to sequentially process each of a plurality of N ($\geq$2) wavelength sub-bands split by a 1-by-N WDM filter 420. A 1-by-N optical switch 421 is used to connect one of the N wavelength sub-bands to the PIN detector 422 at a given time. This can be done under the control of a DSP unit 410. The DSP unit 410 operates as described above to determine the channel powers for the wavelength sub-band currently selected by the 1-by-N optical switch 421. Once that is done, the DSP unit 410 can control the 1-by-N optical switch 421 to select another wavelength sub-band, and so on, until each of the N wavelength sub-bands has been processed.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A method of monitoring a plurality of wavelength channels of an optical wavelength division multiplex (WDM) signal, each wavelength channel being modulated with at least one tone, the method comprising:
    filtering the optical WDM signal into at least two bands, the at least two bands including a long-wavelength band and a short-wavelength band;
    converting individually each of the at least two bands of the filtered optical WDM signal into an electrical signal;
    detecting a tone in at least one of the electrical signals; and
    determining a power of a wavelength channel from the detected tone, wherein the at least one tone with which the wavelength channel is modulated is detected in each of the electrical signals of two adjacent bands of the at least two bands and determining the power of the wavelength channel includes summing the powers of the at least one tone as detected in the electrical signals of the two adjacent bands.

2. The method of claim 1, wherein each of the at least two bands of the filtered optical WDM signal is converted using a respective photo detector.

3. The method of claim 1, wherein the filtering step includes further separating each of the long-wavelength band and the short-wavelength band into at least two sub-bands, and wherein the sub-bands are converted individually.

4. The method of claim 3, wherein the at least two sub-bands of the short-wavelength band include 1,529 nm to 1,536 nm and 1,536 nm to 1,543 nm, and the at least two sub-bands of the long-wavelength band include 1,547 nm to 1,554.5 nm and 1,554.5 nm to 1,562 nm.

5. The method of claim 1, wherein each of the at least two bands of the filtered optical WDM signals is converted using a time-shared photo detector.

6. The method of claim 1, comprising:
    tapping the optical WDM signal from an optical path.

7. The method of claim 1, wherein the at least two bands include 1,529 nm to 1,543 nm and 1,547 nm to 1,562 nm.

8. The method of claim 1, wherein the wavelength channel is in a band that includes 1,543 nm to 1,547 nm.

9. Apparatus for monitoring a plurality of wavelength channels of an optical wavelength division multiplex (WDM) signal, each wavelength channel being modulated with at least one tone, the apparatus comprising:
    a filter for filtering the optical WDM signal into at least two bands, the at least two bands including a long-wavelength band and a short-wavelength band;
    a converter for converting individually each of the at least two bands of the filtered optical WDM signal into an electrical signal;
    a tone detector for detecting a tone in at least one of the electrical signals; and
    a processor for determining a power of a wavelength channel from the detected tones, wherein the at least one tone with which the wavelength channel is modulated is detected in each of the electrical signals of two adjacent bands of the at least two bands and the processor determines the power of the wavelength channel by summing the powers of the at least one tone as detected in the electrical signals of the two adjacent bands.

10. The apparatus of claim 9, wherein the converter comprises a respective photo detector for converting each of the at least two bands of the filtered optical WDM signal.

11. The apparatus of claim 9, wherein the filter includes:
    a first filter for separating the optical WDM signal into the long-wavelength band and the short-wavelength band;
    a second filter for separating the long-wavelength band into at least two sub-bands; and
    a third filter for separating the short-wavelength band into at least two sub-bands,
    wherein the converter converts each of the sub-bands individually.

12. The apparatus of claim 9, wherein the filter includes:
    a 1-by-N filter, and
    a 1-by-N optical switch,
    wherein the 1-by-N optical switch selectively connects one of the at least two bands to the converter.

13. The apparatus of claim 12, wherein the 1-by-N optical switch is controlled by the processor.

14. The apparatus of claim 11, wherein the at least two sub-bands of the short-wavelength band include 1,529 nm to 1,536 nm and 1,536 nm to 1,543 nm, and the at least two sub-bands of the long-wavelength band include 1,547 nm to 1,554.5 nm and 1,554.5 nm to 1,562 nm.

15. The apparatus of claim 9, wherein the at least two bands include 1,529 nm to 1,543 nm and 1,547 nm to 1,562 nm.

16. The apparatus of claim 9, comprising:
    an optical tap for tapping the optical WDM signal from an optical path.

17. The apparatus of claim 9, wherein the wavelength channel is in a band that includes 1,543 nm to 1,547 nm.

* * * * *